United States Patent
Windak

(10) Patent No.: US 9,214,796 B1
(45) Date of Patent: Dec. 15, 2015

(54) SPLICING ASSEMBLY

(71) Applicant: Jack Windak, Elmwood Park, IL (US)

(72) Inventor: Jack Windak, Elmwood Park, IL (US)

( * ) Notice: Subject to any disclaimer, the term of this patent is extended or adjusted under 35 U.S.C. 154(b) by 0 days.

(21) Appl. No.: 14/105,376

(22) Filed: Dec. 13, 2013

(51) Int. Cl.
*H02G 15/08* (2006.01)
(52) U.S. Cl.
CPC .................................. *H02G 15/08* (2013.01)
(58) Field of Classification Search
CPC ..... H02G 15/08; H02G 15/085; H02G 15/10; H02G 15/113; H02G 15/115; H02G 15/117
USPC .... 174/92, 84 R, 91, 84 S, 85, 86, 88 R, 520; 138/155–162
See application file for complete search history.

(56) References Cited

U.S. PATENT DOCUMENTS

| | | | |
|---|---|---|---|
| 2,475,184 A | 7/1949 | Hudson | |
| 4,262,167 A | 4/1981 | Bossard et al. | |
| 4,387,727 A | 6/1983 | Sandstrom | |
| 4,496,795 A | 1/1985 | Konnik | |
| D313,396 S | 1/1991 | Messelhi | |
| 5,854,444 A | 12/1998 | Fehlhaber | |
| 6,220,893 B1 * | 4/2001 | Stephan | 439/519 |
| 7,319,194 B2 | 1/2008 | Bryla | |
| 8,636,524 B2 * | 1/2014 | Montena | 439/98 |
| 2006/0196687 A1 * | 9/2006 | Bryla | 174/92 |
| 2006/0213572 A1 * | 9/2006 | Beaulieu | 138/155 |

FOREIGN PATENT DOCUMENTS

| | | |
|---|---|---|
| CA | 2538634 | 9/2013 |
| WO | WO9737263 | 10/1997 |

* cited by examiner

*Primary Examiner* — Hoa C Nguyen
*Assistant Examiner* — Amol Patel

(57) ABSTRACT

A splicing assembly for electrically coupling a pair of electrical cables together includes a tubular housing that may insertably receive a pair of electrical cables. A coupling member is coupled to said tubular housing. The coupling member may be selectively operationally coupled between the pair of electrical cables. The pair of electrical cables is operationally coupled together.

11 Claims, 2 Drawing Sheets

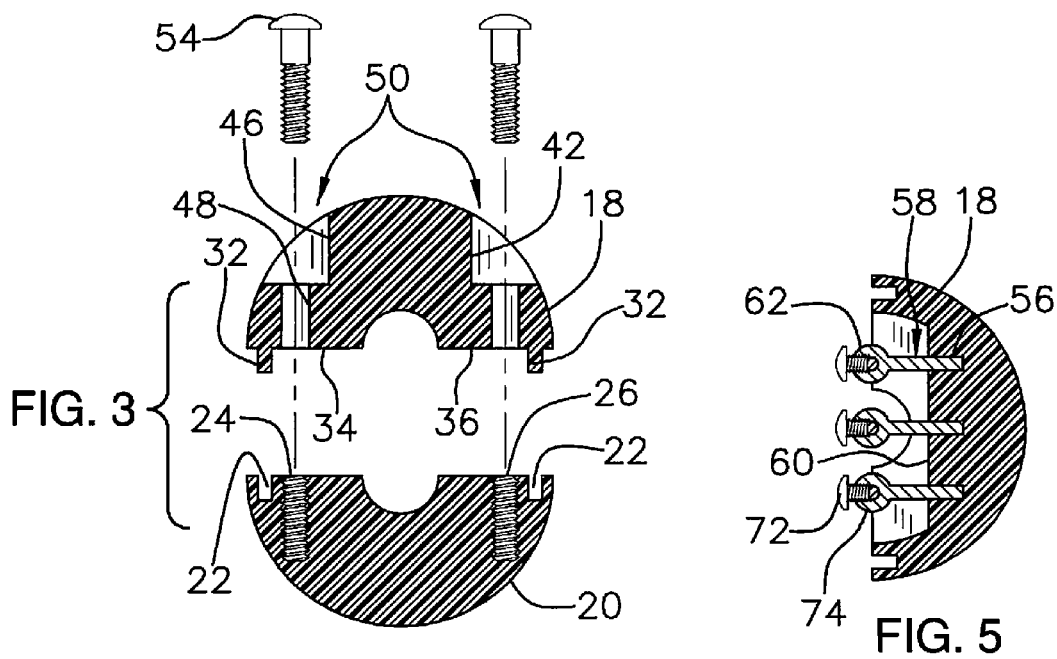
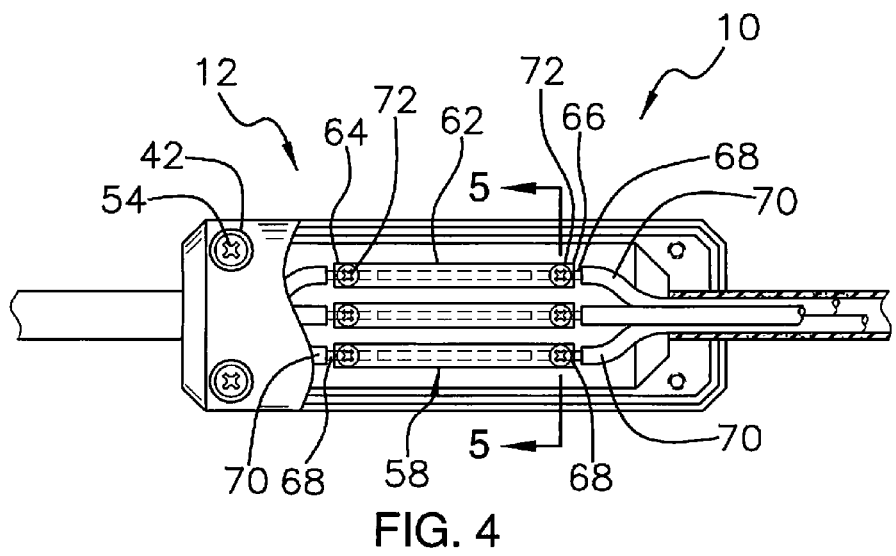

SPLICING ASSEMBLY

BACKGROUND OF THE DISCLOSURE

Field of the Disclosure

The disclosure relates to splicing devices and more particularly pertains to a new splicing device for electrically coupling a pair of electrical cables together.

SUMMARY OF THE DISCLOSURE

An embodiment of the disclosure meets the needs presented above by generally comprising a tubular housing that may insertably receive a pair of electrical cables. A coupling member is coupled to said tubular housing. The coupling member may be selectively operationally coupled between the pair of electrical cables. The pair of electrical cables is operationally coupled together.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a cross sectional view taken along line 3-3 of FIG. 2 of an embodiment of the disclosure.

FIG. 4 is a top cut-away view of an embodiment of the disclosure.

FIG. 5 is a cross sectional view taken along line 5-5 of FIG. 4 of an embodiment of the disclosure.

DESCRIPTION OF THE PREFERRED EMBODIMENT

Figure 1:
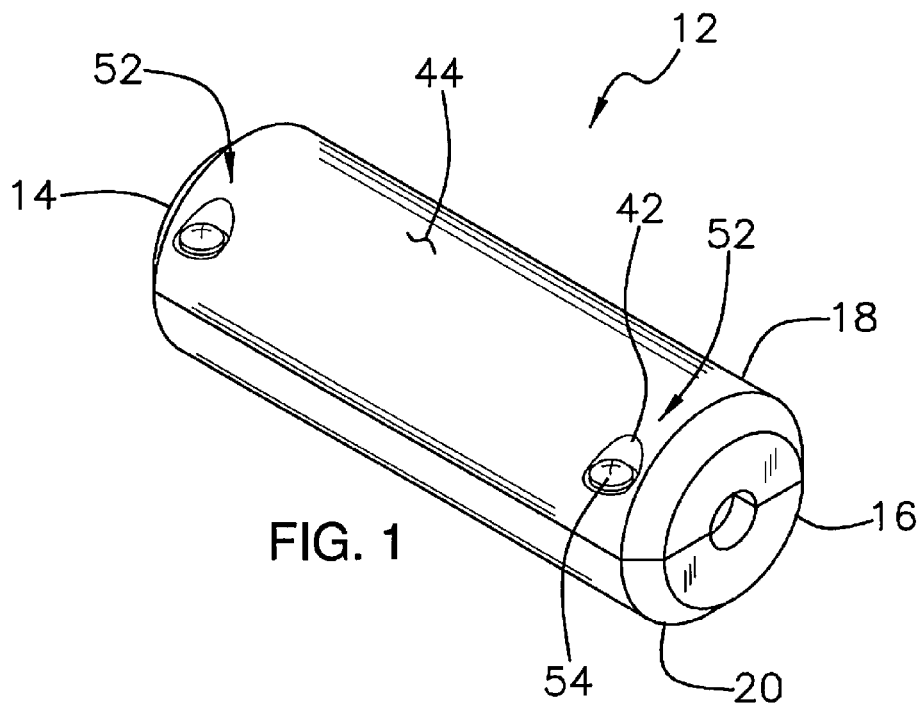
FIG. 1 is a perspective view of a splicing assembly according to an embodiment of the disclosure.
Figure 2:
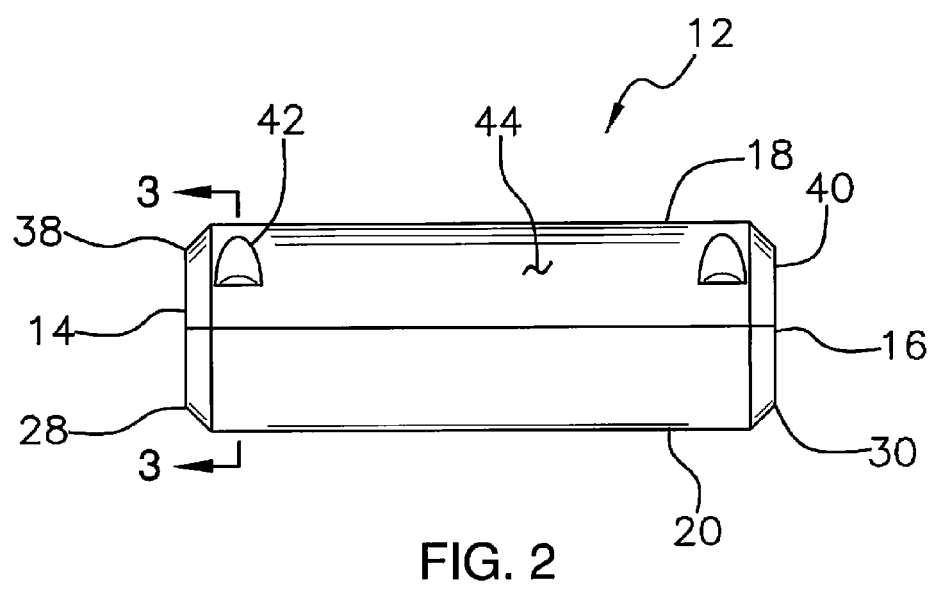
FIG. 2 is a right side view of an embodiment of the disclosure.

With reference now to the drawings, and in particular to FIGS. 1 through 5 thereof, a new splicing device embodying the principles and concepts of an embodiment of the disclosure and generally designated by the reference numeral 10 will be described.

As best illustrated in FIGS. 1 through 5, the splicing assembly 10 generally comprises a tubular housing 12 that is elongated along a longitudinal axis extending through an open first end 14 and an open second end 16 of the tubular housing 12. The tubular housing 12 may have a length between 7 cm and 13 cm and a diameter between 1 cm and 3 cm. Moreover, the tubular housing 12 is split along the longitudinal axis. The tubular housing 12 comprises a top portion 18 of the tubular housing 12 that is selectively coupled to a bottom portion 20 of the tubular housing 12.

A pair of grooves 22 extends into each of an associated one of a first lateral edge 24 and a second lateral edge 26 of the bottom portion 20 of the tubular housing 12. Moreover, each of the pair of grooves 22 extends between each of a first end 28 and a second end 30 of the bottom portion 20 of the tubular housing 12. The pair of grooves 22 may have a depth between 3 mm and 6 mm. A pair of tabs 32 extends downwardly from each of an associated one of a first lateral edge 34 and a second lateral edge 36 of the top portion 18 of the tubular housing 12. Continuing, each of the pair of tabs 32 extends between each of a first end 38 and a second end 40 of the top portion 18 of the tubular housing 12. Lastly, each of the pair of tabs 32 selectively engages an associated one of the pair of grooves 22 so the top portion 18 of the tubular housing 12 is coupled to the bottom portion 20 of the tubular housing 12.

A fastener aperture 42 extends downwardly into an outside surface 44 of the top portion 18 of the tubular housing 12. A top portion 46 of the fastener aperture 42 has a diameter that is greater than a diameter of a bottom portion 48 of the fastener aperture 42. The fastener aperture 42 is one of a pair of the fastener apertures 50 each positioned proximate an associated one of the first lateral edge 34 and the second lateral edge 36 of the top portion of the tubular housing 18. Continuing, the pair of fastener apertures 50 is one of a pair of sets of the fastener apertures 52 each positioned proximate an associated one of the first end 38 and the second end 40 of the top portion of the tubular housing 18.

A plurality of fasteners 54 is each positioned within an associated one of the pair of sets of fastener apertures 42. The plurality of fasteners 54 each engage the bottom portion 20 of the tubular housing 12. Continuing, the top portion 18 of the tubular housing 12 is retained on the bottom portion 20 of the tubular housing 12. Each of the plurality of fasteners 54 may be a screw of any conventional design.

A bottom portion 56 of a coupling member 58 is coupled to an inside surface 60 of the bottom portion 20 of the tubular housing 12. The coupling member 58 extends between the first end 28 and the second end 30 of the bottom portion 20 of the tubular housing 12. Additionally, the coupling member 58 may be comprised of a rigid and electrically conductive material. A top portion 62 of the coupling member 58 has a cylindrical shape. Continuing, each of a first end 64 and a second end 66 of the top portion 62 of the coupling member 58 may insertably receive a conductor 68 of an associated one of a pair of electrical cables 70. The pair of conductors 68 of the pair of electrical cables 70 are electrically coupled together. Lastly, the electrical cable 70 may be an extension cord of any conventional design.

A pair of conductor fasteners 72 extends downwardly into a top 74 of the top portion 62 of the coupling member 58. Further, the pair of conductor fasteners 72 is positioned proximate an associated one of the first end 64 and the second end 66 of the top portion 62 of the coupling member 58. The pair of conductor fasteners 72 engages an associated one of the pair of conductors 68 so the pair of conductors 68 is retained in the coupling member 58. Moreover, the coupling member 58 is one of a plurality of the coupling members 58. The plurality of coupling members 58 is evenly distributed between the first lateral edge 24 and the second lateral edge 26 of the bottom portion 20 of the tubular housing 12. Additionally, the plurality of coupling members 58 each is electrically coupled to an associated pair of a plurality of the conductors 68 in the pair of electrical cables 70.

In use, each of the plurality of conductors 68 in the pair of electrical cables 70 is electrically coupled to an associated one of the plurality of coupling members 58. The top portion 18 of the tubular housing 12 is coupled to the bottom portion 20 of the tubular housing 12 so the plurality of conductors 68 are completely enclosed in the tubular housing 12. Continuing, the pair of electrical cables 70 may be a broken electrical cable 70 to be spliced back together. Further, the pair of electrical cables 70 may be two separate electrical cables 70 to be joined together. The tubular housing 12 prevents water or foreign objects from contacting the plurality of conductors 68.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A splicing assembly for electrically coupling a pair of electrical cables together, said assembly comprising:
   a tubular housing configured to insertably receive the pair of electrical cables, said tubular housing being split along a longitudinal axis wherein said tubular housing comprises a top portion of said tubular housing selectively coupled to a bottom portion of said tubular housing;
   a coupling member coupled to said tubular housing wherein said coupling member is configured to be selectively operationally coupled between the pair of electrical cables wherein the pair of electrical cables is operationally coupled together; and
   a pair of tabs extending downwardly from each of an associated one of a first lateral edge and a second lateral edge of said top portion of said tubular housing, each tab extending further along ends of said top portion transversely away from said first lateral edge and said second lateral edge respectively, each of said pair of tabs extending between each of a first end and a second end of said top portion of said tubular housing inset from an outer surface of said tubular housing, each said tab engaging an associated groove extending into said bottom portion of said tubular housing wherein outer peripheral edges of said top portion and said bottom portion are aligned and flush when said tabs are fully inserted into said grooves.

2. The assembly according to claim 1 further comprising said tubular housing being elongated along a longitudinal axis extending through an open first end and an open second end of said tubular housing.

3. The assembly according to claim 1 further comprising a fastener aperture extending downwardly into an outside surface of a top portion of said tubular housing.

4. The assembly according to claim 3 further comprising said fastener aperture being one of a pair of said fastener apertures each positioned proximate an associated one of a first lateral edge and a second lateral edge of said top portion of said tubular housing.

5. The assembly according to claim 4 further comprising said pair of fastener apertures being one of a pair of sets of said fastener apertures each positioned proximate an associated one of a first end and a second end of said top portion of said tubular housing.

6. The assembly according to claim 1 further comprising a plurality of fasteners each positioned within an associated one of a pair of sets of fastener apertures wherein said plurality of fasteners engages a bottom portion of said tubular housing wherein a top portion of said tubular housing is retained on said bottom portion of said tubular housing.

7. The assembly according to claim 1 further comprising a bottom portion of said coupling member being coupled to an inside surface of a bottom portion of said tubular housing wherein said coupling member extends between a first end and a second end of said bottom portion of said tubular housing.

8. The assembly according to claim 1 further comprising a top portion of said coupling member having a cylindrical shape wherein each of a first end and a second end of said top portion of said coupling member is configured to insertably receive a conductor of an associated one of the pair or electrical cables wherein the pair of conductors of the pair of electrical cables are electrically coupled together.

9. The assembly according to claim 1 further comprising said coupling member being one of a plurality of said coupling members being evenly distributed between a first lateral edge and a second lateral edge of a bottom portion of said tubular housing.

10. The assembly according to claim 9 further comprising said plurality of coupling members each being electrically coupled to an associated pair of a plurality of conductors in the pair of electrical cables.

11. A splicing assembly for electrically coupling a pair of electrical cables together, said assembly comprising:
   a tubular housing being elongated along a longitudinal axis extending through an open first end and an open second end of said tubular housing, said tubular housing being split along said longitudinal axis wherein said tubular housing comprises a top portion of said tubular housing being selectively coupled to a bottom portion of said tubular housing;
   a pair of tabs extending downwardly from each of an associated one of a first lateral edge and a second lateral edge of said top portion of said tubular housing, each tab extending further along ends of said top portion transversely away from said first lateral edge and said second lateral edge respectively, each of said pair of tabs extending between each of a first end and a second end of said top portion of said tubular housing inset from an outer surface of said tubular housing, each said tab engaging an associated groove extending into said bottom portion of said tubular housing wherein outer peripheral edges of said top portion and said bottom portion are aligned and flush when said tabs are fully inserted into said grooves;
   a fastener aperture extending downwardly into an outside surface of said top portion of said tubular housing, said fastener aperture being one of a pair of said fastener apertures each positioned proximate an associated one of said first lateral edge and said second lateral edge of said top portion of said tubular housing, said pair of fastener apertures being one of a pair of sets of said fastener apertures each positioned proximate an associated one of said first end and said second end of said top portion of said tubular housing;
   a plurality of fasteners each positioned within an associated one of said pair of sets of fastener apertures wherein said plurality of fasteners engages said bottom portion of said tubular housing wherein said top portion of said tubular housing is retained on said bottom portion of said tubular housing;

a bottom portion of a coupling member being coupled to an inside surface of said bottom portion of said tubular housing wherein said coupling member extends between said first end and said second end of said bottom portion of said tubular housing;

a top portion of said coupling member having a cylindrical shape wherein each of a first end and a second end of said top portion of said coupling member is configured to insertably receive a conductor of an associated one of the pair or electrical cables wherein the pair of conductors of the pair of electrical cables are electrically coupled together; and said coupling member being one of a plurality of said coupling members being evenly distributed between said first lateral edge and said second lateral edge of said bottom portion of said tubular housing, said plurality of coupling members each being electrically coupled to an associated pair of a plurality of the conductors in the pair of electrical cables.

\* \* \* \* \*